Fig. 1.

INVENTOR.
FREDERICK J. EWING,
BY Philip Subkow
ATTORNEY.

Nov. 5, 1946.  F. J. EWING  2,410,436
CATALYSTS AND CATALYTIC PROCESSES
Filed Sept. 7, 1942  3 Sheets-Sheet 3

INVENTOR.
FREDERICK J. EWING,
BY Philip Subkow
ATTORNEY.

Patented Nov. 5, 1946

2,410,436

UNITED STATES PATENT OFFICE 2,410,436

CATALYSTS AND CATALYTIC PROCESSES

Frederick J. Ewing, Pasadena, Calif., assignor to Filtrol Corporation, Los Angeles, Calif., a corporation of Delaware Application September 7, 1942, Serial No. 457,625

14 Claims. (Cl. 196—52)

This invention relates to an improved catalyst for cracking of petroleum oil and to a process for manufacturing said catalyst as well as to process of catalytic cracking and of oil decolorizing employing such catalyst.

Catalytic cracking of petroleum whereby increased yields of gasoline of high octane value may be obtained has employed as catalysts either synthetically produced oxides or acid treated montmorillonite clays.

The most successful catalyst employed in the recent past is the acid treated montmorillonite type clay such as has been widely used in the decolorization of petroleum oil. This invention is related to the beneficiation of this type of catalyst whereby its catalytic activity is greatly enhanced.

By the process of my invention acid treated clays which have substantial activity in the cracking of petroleum may be enhanced in value as cracking catalysts by aluminating the activated clay either by base exchange or by deposit of hydrated alumina.

By reacting clay with acid beyond a degree required to develop its optimum catalytic efficiency I have been able to enhance the catalytic activity of clay by alumination. If the acid treatment is conducted at below this lower limit, the catalytic efficiency is not improved to any appreciable extent and may be depreciated in catalytic value by alumination. As the acid dosage is increased beyond this lower limit the degree of beneficiation obtained by the deposit of the hydrated alumina is increased.

In my process the catalytic value of the clay is improved by precipitating alumina from an aluminum salt solution by an alkali, preferably ammonia.

While I have used bases to precipitate the hydrated alumina on the acid treated clay, I have also improved the catalytic activity of the clay by hydrolyzing an aluminum salt in the presence of the acid treated clay.

I have also increased the catalytic value of the clay by depositing the alumina base by exchange with the hydrogen or other exchangeable cations of the hydrogen montmorillonite formed by acid treating montmorillonite clay.

The prior art acid treated montmorillonite clay which has been widely used as a catalyst and which has been sold under the brand name Super "Filtrol" is the same product as has been found to have superior properties in decolorizing petroleum lubricating oil. When this catalyst is employed in cracking petroleum it has been found to have a substantial cracking efficiency. It also has a high decolorizing efficiency. The untreated clay from which such clays are obtained have a low catalytic and decolorizing efficiency.

The Super "Filtrol" is produced by a limited treatment of the native clay. The clay used in producing Super "Filtrol" belongs to that type known as the sub-bentonites. They are montmorillonite clays which unlike bentonite do not naturally possess pronounced swelling characteristics. They are distinguished by the fact that whereas the natural clay possesses little decolorizing activity, their decolorizing activity may be largely enhanced by acid treatment. In like manner the catalytic activity of the untreated clays in cracking of petroleum is low but may be largely enhanced by the acid treatment. The response of the clay to acid treatment in the development of its catalytic and decolorizing activity is such a characteristic property of this class of clays that it may be taken as a description of and a definition of the type of clays forming the subject matter of this invention.

It has long been known that where such clays are treated the degree of improvement of decolorizing efficiency increases to a maximum and as the treatment is made more rigorous the decolorizing efficiency begins to fall off. There is thus an optimum value of treatment with sulfuric acid to reach levels of the maximum decolorizing efficiency.

The catalytic activity of clays of the type that are activatable by acid to enhance their catalytic activity, I have found, increases as the degree of treatment is increased until the catalytic activity passes through an optimum and that thereafter the catalytic activity is depreciaed as the treatment becomes more rigorous.

In order for a clay to be placed in the most favorable state for beneficiation by alumina, it is desirable in my process to treat the clay beyond that degree necessary to develop its optimum catalytic efficiency. As the clay is more and more rigorously treated so that the catalytic activity of the acid treated clay is carried further below its optimum value, the degree of enhancement of catalytic activity by alumination is increased. If such a clay is activated by alumination we may obtain a catalyst of substantially enhanced catalytic activity higher than the catalytic activity of the acid treated clay which has been subjected to alumination, and higher than the optimum value of the catalytic activity of the acid activated but unaluminated clay. I have found that if the acid treatment is not carried beyond that necessary to develop the optimum catalytic activity of the acid treated clay or only to such a degree of activation, such clay on alumination will not have its catalytic activity enhanced substantially and may indeed have its catalytic activity substantially impaired.

A similar phenomenon exists in my process with regard to the decolorizing efficiency of the clay.

If the clay is treated with acid under optimum conditions to develop the maximum decolorizing efficiency, it will be found that on alumination the decolorizing efficiency is not enhanced, but in fact may be materially impaired. In order to obtain an enhancement of the decolorizing activity of the clay above that of the acid treated clay the degree of activation by acid must be carried beyond the optimum treat to develop the maximum decolorizing activity and the degree of this enhancement increases as the rigor of the treat increases beyond this optimum value. If the clays are not treated beyond their so-called optimum treatment such clays on alumination will not be enhanced in decolorizing efficiency and may in fact be substantially impaired in decolorizing efficiency.

I have thus been able by adjusting the treatment to carry the clay beyond that amount of acid leaching necessary to develop the optimum decolorizing and the optimum catalytic activity and to prepare, by alumination, a clay having a high catalytic efficiency and at the same time having a high decolorizing efficiency. I have been thus able to obtain both an enhancement of catalytic activity and to develop a decolorizing activity which compares favorably with the clay subjected to alumination.

In my process the base exchange capacity of montmorillonite clays decreases with continued extraction. In order for the maximum catalytic activity and the maximum decolorizing activity to be developed by acid treatment, this base exchange capacity must thus be reduced to an optimum quantity. As the base exchange capacity is lowered beyond this point the catalytic efficiency and the decolorizing efficiency of the clay is depreciated.

In order for a clay to be subject to enhancement of its catalytic activity, I have found that the treatment must be carried beyond this point of optimum base exchange capacity and into the region where the treatment causes a large decrease in base exchange capacity. The degree of enhancement of the catalytic efficiency is the greater, the lower the base exchange capacity of the clay, and the lower its catalytic efficiency.

In like manner the decolorizing efficiency of an acid treated clay also passes through a maximum value at an optimum base exchange capacity and is depreciated as the base exchange capacity is lowered beyond this optimum value. For relatively high values of base exchange capacity I have found that alumination of the clay depreciated the decolorizing efficiency of the clay. However, the decolorizing efficiency of the aluminated clay also passes through a maximum at an optimum value of the base exchange capacity of the aluminated clay. In fact the decolorizing efficiency of the aluminated clay may actually be higher than that of the acid treated clay from which the aluminated clay is produced, provided that the base exchange capacity of the acid treated clay is low.

Thus by appropriately controlling the acid activation to produce a clay having a base exchange capacity lower than the optimum value for maximum catalytic efficiency of the acid treated clay and aluminating this clay, I may obtain an aluminated clay of enhanced catalytic efficiency and of high decolorizing efficiency.

In order to prepare the clay for beneficiation it is preferable to wash the clay after acid treatment with water substantially free of calcium ions such as soft or distilled water.

The alumination of the acid treated washed clay may be obtained by depositing the hydrated alumina by any one of several procedures wherein a hydrated alumina is deposited from a solution of an aluminum compound. The best results are obtained by controlling the pH of the solution from which deposit is made.

A salt of a strong acid such as aluminum sulfate may be hydrolyzed to precipitate hydrated alumina. The aluminum salt may be reacted with an alkali such as sodium hydroxide, sodium carbonate or potassium hydroxide. I have found that superior results are obtained if ammonium hydroxide is used. In using such hydroxide, it is desirable to control the final pH of the solution to be in the range of 3 to 8. I have found that a pH of about 7 is to be preferred, and that a pH of 9 results in deterioration of the catalytic efficiency.

After the hydrated alumina is precipitated it is desirable when the amount of hydrated alumina (calculated as $Al_2O_3$) is in the neighborhood of 5%, to wash the clay thoroughly, employing calcium free water such as distilled water, or soft water.

However, where the amount of hydrated alumina (calculated as $Al_2O_3$) is in the neighborhood of 1%, it is desirable to limit or even omit the water wash. Thorough washing results in an impairment of the catalytic activity.

The following examples illustrate my discoveries and the preferred embodiment of my invention and are to be taken as illustrating my invention, and are not to be taken as limiting the same.

A montmorillonite clay of the sub-bentonite type which is activatable by treatment with acid, now a recognized type of clay in this art, was mixed with sulfuric acid and heated to boiling with agitation. The particular clay employed in all of the following examples is a typical clay of this type, originating at Cheto, Arizona, and used commercially in the production of an acid treated clay which is widely used as a decolorizing clay and as a cracking catalyst.

The acid treatment given according to the procedure outlined above was carried out for a period of 6 hours at boiling temperature. The clay was treated with the dosage of acid and at the concentration set forth in the examples. After acid treatment the clay was washed with distilled or soft water substantially free of calcium ions in an amount sufficient to leave a residual acidity of about 5 milligrams of KOH per gram of clay calculated on clay of 20% volatile matter. This residual acidity is determined by boiling the washed and treated clay with water in the ratio of 5 grams of clay to 100 c. c. of water and filtering and washing the clay. The filtrate is titrated into N/10 KOH to a phenophthalein end point. It is considered sufficiently washed if the clay contains the above acidity. It is to be understood that this is merely a standard of washing for the clay in order to make all the examples comparative and may be altered to fit the conditions of operation and the clay used without departing from my invention.

The acid treated clay after washing was slurried with a calculated amount of aluminum sulfate and ammonia was added until the desired final pH was obtained.

In the following Examples 1 to 7 inclusive, the ammonium hydroxide was added to bring the slurry to a pH of 5. The amount of aluminum sulfate was employed which is chemically equivalent to the percent of $Al_2O_3$ which it is desired to precipitate in hydrated form. Thus for example, where the percent $Al_2O_3$ is given as 1 or 5% $Al_2O_3$ as the case may be, the aluminum sulfate was added in equivalent amount. This clay slurry was stirred to insure the uniform deposit of the hydrated alumina and the slurry filtered. The filter cake was washed as stated above, employing in all of the Examples 1 to 8 inclusive 1 gallon of water per pound of volatile free clay on the filter.

This standard of washing was employed in all of the treats of the clays reported in Examples 1 to 8, in order to make the results comparable. However, this degree of washing is not essential to my invention. It may depend on the nature of the acid treat, the clay used and the degree of alumination employed. As will be seen from example 9 it may at times be desirable to limit the degree of washing to less than this amount to get in certain cases a further enhancement of catalytic efficiency.

The filtered and washed clay is dried and comminuted to a powder. For use as a decolorant it may be used as a powder and may be used in powdered form or in pelleted form as a catalyst.

The various clays produced in the following examples were employed in catalytic cracking. For purposes of comparing the efficiency of the various clays as produced in the following examples all of the clays were subjected to the same cracking conditions. Gas oil vapors, employing the same stock in each example, were passed through the catalyst bed maintained at 850° F. The vapors are treated to condense out the condensible material and the content of 400° E. P. gasoline in the condensate determined. The yield of 400° E. P. gasoline is expressed as a volume percent of the volume of gas oil charged. As has been described above the raw un-treated clay having a volatile content of 20% yields 10% at 400° E. P. gasoline by this procedure. It is given a catalytic efficiency rating of 1. The catalytic efficiency of the other clays is expressed as the ratio of the yield of 400° E. P. gasoline produced to 10%.

The clays produced according to the following examples were also employed in treating lubricating oil stock to decolorize the oil. In order to compare their decolorizing efficiency the same oil was treated to bring the oil to a standard color. The method employed was to heat oil and clay to a high temperature with agitation of the oil and introduction of steam. The oil employed in the following comparison of decolorizing efficiency of the clays produced in the examples given below was a Mid-Continent cylinder stock partially dewaxed to give a 35° pour point with a viscosity of about 15 seconds at 210° F. and flash of about 130–160° F. The duration of treatment was about 5 minutes at a temperature of about 550° F. The oils were treated with various amounts of clay and the amount of clay required to bring the oil to an optical density of about 300 according to the method described by Ferris and McIllvain, published in analytical edition of Industrial and Engineering Chemistry, vol. 6, page 23, January 15, 1934, was determined.

According to this method a standard grade of acid treated clay, sold as Super "Filtrol", a trademarked product of the Filtrol Corporation, requires 4.86 grams of clay to bring the oil to the above 300 optical density color. The native clay employed in the following examples and which had a catalytic rating of 1 required 18 grams of clay to bring the oil to the above optical density color. It is here given a decolorizing efficiency rating of 1. The standard Super "Filtrol" is therefore given a decolorizing efficiency rating of 3.7.

In the following examples and throughout this discussion by the term "dosage" is meant the weight percent of anhydrous $H_2SO_4$ charged to the treat, based on the weight of clay evaluated as volatile-free clay. The term "concentration" is the concentration of $H_2SO_4$ in the water phase including the water content of the clay charged to the system. The term "base exchange capacity" is expressed as the milli-equivalents of exchangeable ions based on 100 grams of volatile free clay as determined by the test procedure identified below. The percentage of $Al_2O_3$ is the weight percent of hydrated alumina calculated as $Al_2O_3$ and based on volatile free clay. Volatile free clay is meant to be clay free of water removable by ignition for 20 minutes at a temperature of at least 1700° F. The volatile content of the clay is the percent loss in weight when the clay containing water is ignited to such temperature for such period.

Where the term "base exchange capacity" is used in this application it is to be understood as expressed in milli-equivalents per hundred grams of volatile free clay as determined by the test described by Bower and Truog in the analytical edition of Industrial and Engineering Chemistry, vol. 12, No. 7, page 411, July 15, 1940, in which the clay sample is exchanged with manganous ions and the latter released and measured colorimetrically.

The native clay which is given the relative catalytic efficiency of 1 and the relative decolorizing efficiency of 1, had a base exchange capacity by the above test of 124.

*Example 1*

Clay was treated with acid in an amount of 30% by weight at a concentration of 12.5%. The relative catalytic efficiency of the clay was 4.6, and the relative decolorizing efficiency was 3.44, and the base exchange capacity was 104.1. The acid treated clay was impregnated with hydrated alumina equal to 1% $Al_2O_3$. Its relative catalytic efficiency was equal to 4.2 and its relative decolorizing effect was 3.25 with a base exchange capacity of 100.5, and at 5% $Al_2O_3$ it had a relative catalytic efficiency of 4.0 and its relative decolorizing efficiency was 2.11 and had a base exchange capacity of 119.4.

*Example 2*

Clay was treated with 45 pounds of acid per hundred pounds of volatile free clay at a concentration of 12.5%. The relative catalytic efficiency of the treated clay was 4.4 and its relative decolorizing efficiency was 3.32, and its base exchange capacity was 95.2. This clay was treated to deposit 5% of $Al_2O_3$. The material thus aluminated had a relative catalytic efficiency of 4.8.

The clay was heated with 45 pounds of acid per hundred pounds of volatile free clay at a concentration of 20%. The relative catalytic efficiency of this clay was 4.6 and the relative decolorizing efficiency was 3.51.

*Example 3*

Clay was treated with acid in the amount of 60% by weight at the following concentrations, and each of the clays was employed in catalytic cracking and in decolorizing, and their efficiencies and base exchange capacity determined.

| Percent concentration of acid used in acid treatment | Base exchange capacity | Catalytic efficiency | Decolorizing efficiency |
|---|---|---|---|
| 12.5 | 82.1 | 4.4 | 3.55 |
| 25 | 58.1 | 4.2 | 3.48 |

The clays were treated to deposit alumina by the above procedure, in the amounts shown in the table, and the catalyst was employed in catalytic cracking and decolorizing oil according to the above procedures. The base exchange capacity was determined.

| Percent concentration of acid used in acid treatment | Base exchange capacity | Percent $Al_2O_3$ | Relative catalytic efficiency | Relative decolorizing efficiency |
|---|---|---|---|---|
| 12.5 | 88.2 | 1 | 4.8 | 2.88 |
| 12.5 | 78.3 | 5 | 4.8 | 2.96 |
| 25 | 59.2 | 5 | 4.8 | 3.07 |

Example 4

Clay was treated with 75% sulfuric acid by weight at the following concentrations and each of the clays was employed in catalytic cracking and in decolorizing oil. The base exchange capacity of the clay was determined.

| Percent concentration of acid used in acid treatment | Base exchange capacity | Relative catalytic efficiency | Relative decolorizing efficiency |
|---|---|---|---|
| 12.5 | 59.3 | 4.2 | 3.11 |
| 31.6 | 29.2 | 2.8 | 2.22 |

The acid treated clays were treated to deposit hydrated alumina in the amounts given in the table and their catalytic efficiency and decolorizing efficiency determined by employing the clays in the above cracking and decolorizing procedures. The base exchange capacity was determined.

| Percent concentration of acid used in acid treatment | Base exchange capacity | Percent $Al_2O_3$ | Relative catalytic efficiency | Relative decolorizing efficiency |
|---|---|---|---|---|
| 12.5 | 78.6 | 1 | 4.6 | 3.14 |
| 12.5 | 59.9 | 5 | 5.0 | 3.14 |
| 31.6 | 43.0 | 5 | 4.4 | 2.88 |

Example 5

Clay was treated with 125% of sulfuric acid by weight at the following concentrations and the catalytic efficiencies and decoloring efficiencies determined by employing the clays in the processes described above. Their base exchange capacities were determined.

| Percent concentration of acid used in acid treatment | Base exchange capacity | Relative catalytic efficiency | Relative decolorizing efficiency |
|---|---|---|---|
| 5 | 79.4 | 5.0 | 4.04 |
| 8 | 69.5 |  | 3.81 |
| 12.5 | 41.2 | 3.6 | 2.78 |
| 40.0 | 13.0 | 1.0 | .74 |

The clays were treated with hydrated alumina in the above procedure in an amount given in the table below and their catalytic efficiency and decolorizing efficiency determined by employing the clay in the same processes as described above. The base exchange capacity was determined.

| Percent concentration of acid used in acid treatment | Base exchange capacity | Percent $Al_2O_3$ | Relative catalytic efficiency | Relative decolorizing efficiency |
|---|---|---|---|---|
| 5 | 86.4 | 5 |  | 1.81 |
| 8 | 74.1 | 5 | 5.2 | 3.29 |
| 12.5 | 76.7 | 1 | 5.0 | 3.44 |
| 12.5 | 68.6 | 2.5 | 4.8 | 3.40 |
| 12.5 | 73.7 | 5 | 5.2 | 3.24 |
| 12.5 |  | 10 | 4.6 |  |
| 12.5 | 28.2 | 20 | 3.8 | 1.22 |
| 40.0 |  | 5 |  | 2.11 |

Example 6

The clay was treated with 175% acid by weight dosage at a concentration of 12.5%. The clay had a relative catalytic efficiency of 2.4 and a relative decolorizing efficiency of 2.11 when used in the procedures above. It had a base exchange capacity of 20.7. It was aluminated with hydrated alumina in an amount of 1% (calculated as $Al_2O_3$). The catalytic activity of the aluminated clay when used in the same process was 4.2, decolorizing efficiency 1.78, and a base exchange capacity of 41.3. When treated with hydrated alumina as above described in an amount of 5% (calculated $Al_2O_3$) the clay had a relative catalytic efficiency of 4.6.

Example 7

Clay was treated with 250% by weight of acid at 12.5% concentration. It had a relative decolorizing efficiency of 1.52, and a base exchange efficiency of 12.7. The clay was treated with aluminum sulfate and ammonia to deposit hydrated alumina equal to 1% (calculated $Al_2O_3$). It had a relative catalytic efficiency of 3.8 and a relative decolorizing efficiency of 1.74, and a base exchange capacity of 37.8. When the acid treated clay was aluminated in the above manner to form hydrated alumina in an amount of 5% (calculated $Al_2O_3$) the aluminated clay had a relative catalytic efficiency of 4.6 and a relative decolorizing efficiency of 2.52, and a base exchange capacity of 41.2.

I have in the drawings (Figs. 1 to 5) charted the various results obtained in the above examples.

Figure 1:
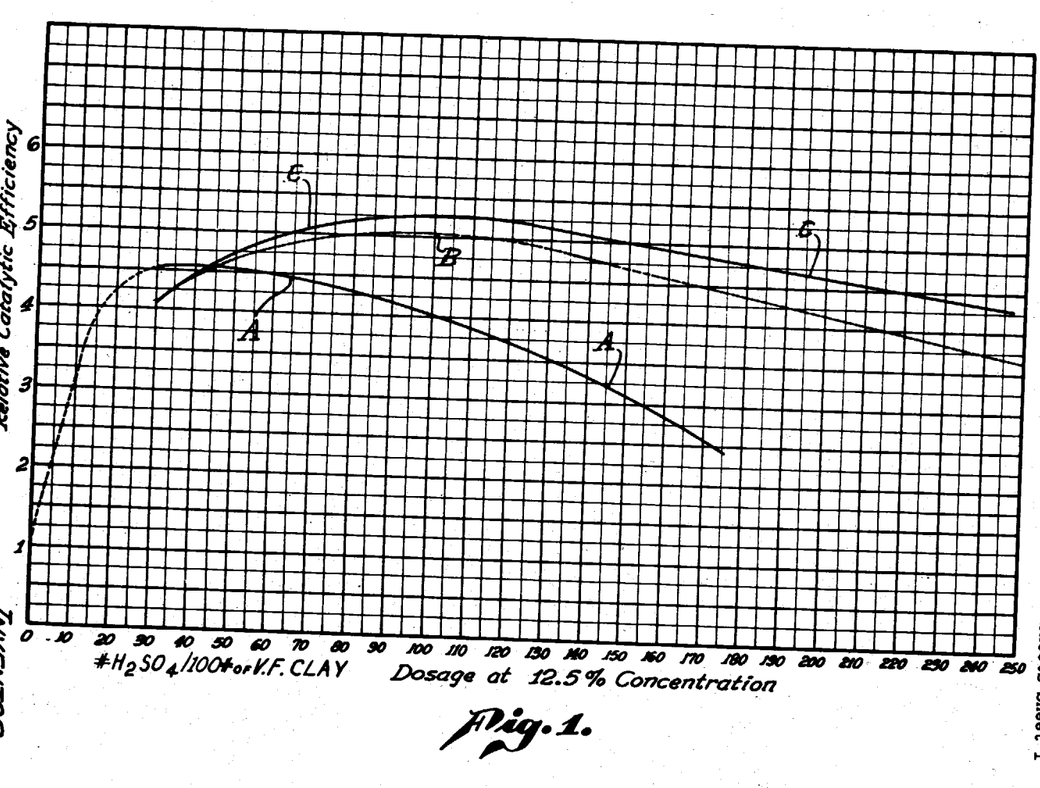

In Fig. 1 is charted the effect of acid dosage upon the catalytic activity of the acid treated clay and upon the catalytic activity of the clay when hydrated alumina in amounts of 1% and 5% (calculated as $Al_2O_3$) is deposited on the clay. All of the acid dosages were used in 12.5% concentration.

Curve A shows the effect of acid dosage on catalytic efficiency. The relative catalytic efficiency is raised to 4.2 by treatment with 30 pounds of acid per hundred pounds of volatile free clay at 12.5% concentration. If the dosage is increased beyond this amount the catalytic efficiency is decreased dropping to about 2.5 when using 175 pounds. Curve B shows the augmentation or depreciation of the catalytic efficiency of clay treated at the various acid dosages with 1% of $Al_2O_3$, and curve C shows the same phenomenon by alumination with 5% $Al_2O_3$. The spread between curve A and B or A and C gives the degree of beneficiation or depreciation of clay obtained by treatment at various acid dosages upon alumination of such clays.

If the clay treated with 30 pounds of $H_2SO_4$ per hundred pounds of volatile free clay is aluminated with either 1% or 5% alumina the clay is depreciated in catalytic activity. I must go beyond this point in acid treatment to get an augmentation of catalytic activity by alumination. I begin to get a noticeable beneficiation when the clay is treated with 45 pounds. I obtain the maximum benefit by alumination on employing a clay which has been treated in the region of 75 to about 150 pounds of $H_2SO_4$ per hundred pounds of volatile free clay in which region a large drop in catalytic activity of the clay by such acid treatment occurs over that which may be developed by the lower acid dosage.

Figure 2:
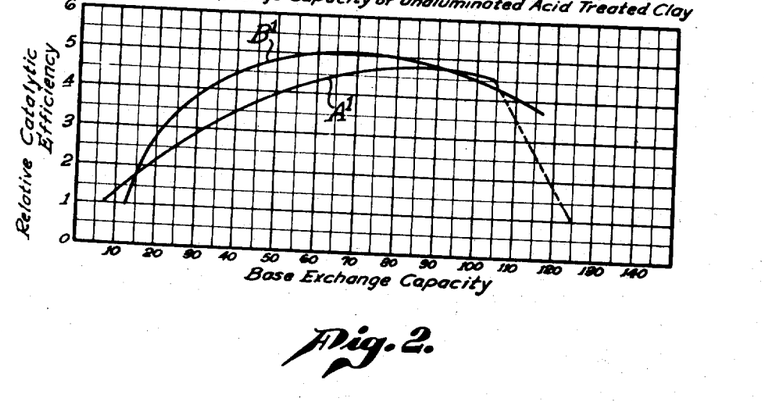

While the comparison made in Fig. 1 is based on using the same concentration of acid while varying the acid dosage, Fig. 2 shows the phenomenon irrespective of acid dosage or concentration. In Fig. 2 I have plotted the variation of catalytic activity with base exchange capacity of the acid treated hydrogen montmorillonite. The curve A, Fig. 2, plots the base exchange capacity of the acid treated clays when employing the various dosages and concentrations employed in the examples. The curve is therefore independent of these variables.

The catalytic activity of the native clay when converted from the calcium montmorillonite of which the native clay is composed, rises sharply with but a small reduction in base exchange capacity. The base exchange of the hydrogen montmorillonite, however, occurs by removal of hydrogen, i. e. the exchangeable base is largely hydrogen, whereas in the native clay the exchangeable bases are largely calcium and magnesium. As the base exchange capacity of the montmorillonite is decreased by further leaching with acid its catalytic activity rises slightly and then falls off. In the region of 80 and higher the catalytic activity does not change very much, and beyond this region the curve becomes steeper representing a greater depreciation of catalytic capacity with reduction of base exchange capacity.

In curve $B^1$, I have plotted the catalytic activity of the aluminated clay produced by various dosages and concentrations and aluminated by various percentages of $Al_2O_3$ from 1% to 20%, against the base exchange capacity of the aluminated clay. This curve therefore represents the variation of catalytic activity of aluminated montmorillonite. It will be observed from curve $B^1$ that as the base exchange capacity of aluminated clay is decreased the catalytic activity rises to a maximum and then decreases. At base exchange capacity of about 30 to 110 it reaches catalytic efficiency four or more times that of the native clay and is equal to or better than the best acid treated clay catalyst of the prior art. In the region of approximately 60 to 80 or 90 it reached an efficiency which is about 30% more efficient than the best acid treated prior art clay.

Figure 3:
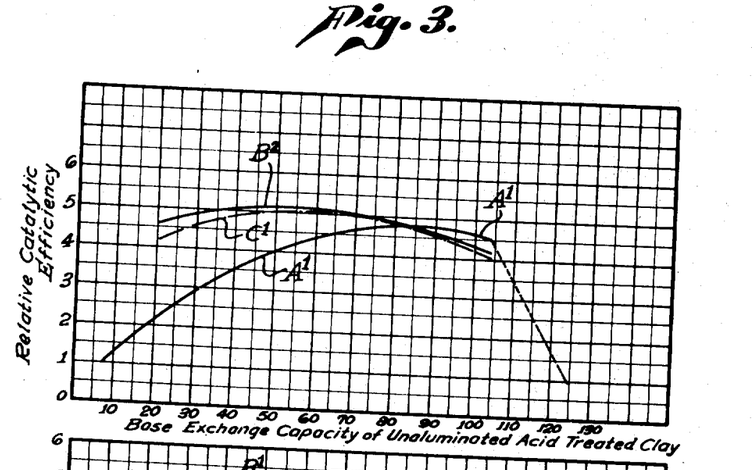

In Fig. 3, I have replotted curve $A^1$ of Fig. 2 as curve $A^1$ of Fig. 3. Curve $B^2$ shows the effect of alumination by 5% $Al_2O_3$, of various base exchange capacity clays produced by acid leaching of the base clay, i. e. the indicated base exchange capacities refer to the leached clay before alumination rather than to the exchange capacity of the aluminated product. Curve C shows the effect of alumination of the same leached base clays with 1% of $Al_2O_3$. It will be observed that not until the hydrogen montmorillonite clay had been reduced to a base exchange of 80 to 90 that the alumination of the clay produced an enhancement of catalytic activity. In clays of higher base exchange capacity the alumination actually depreciated the catalytic activity of the clay. The spread between curves $B^2$ and $C^1$ represents the difference in the effect of 1 and 5% of $Al_2O_3$ on the activity and base exchange capacity of the aluminated clay.

It will be observed that these curves show the effect of alumination of hydrogen montmorillonite clay reduced to various base capacities irrespective of dosage or concentration employed. However, the phenomenon observed and discussed in relation to Fig. 1 appears also in Fig. 3. It will be observed that here also the enhancement of catalytic activity by alumination of hydrogen montmorillonite does not appear until the clay is over-treated. Until the catalytic activity of the hydrogen montmorillonite has been depreciated beyond its optimum value, the enhancement by alumination does not occur and the degree of enhancement becomes larger as the catalytic activity is lowered by extensive leaching. The maximum catalytic activity is obtained in the treats illustrated in Fig. 3 by aluminating acid treated clay whose base exchange capacity is reduced to the region of 30 to 80. The degree of enhancement of the hydrogen montmorillonite varies from substantially no enhancement for hydrogen montmorillonite about 80 to 90 base exchange capacity to as much as 100% enhancement at a base exchange capacity of about 20. The curve shows that if the hydrogen montmorillonite has a base exchange capacity of 100 or more the catalytic activity is depreciated substantially by the alumination of the clay. The maximum catalytic activity is obtained, as will be seen from the curve at the optimum base exchange capacity and results in a clay having 5 or more times the catalytic activity of the native clay and more than 25% greater activity than the best acid washed clay catalyst of the prior art.

Figure 4:
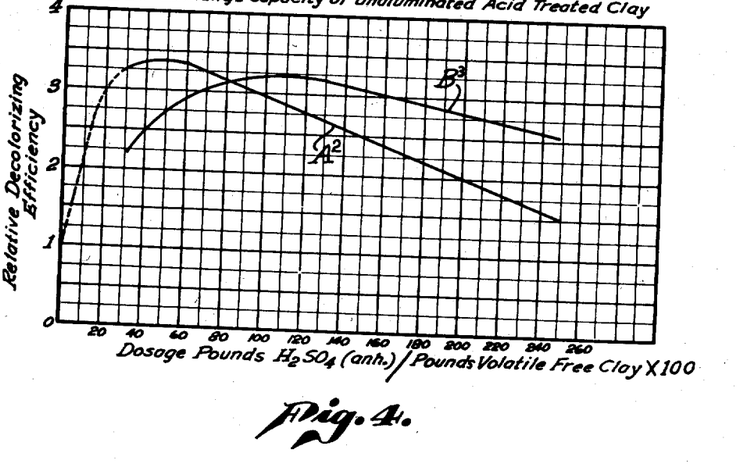
Figure 5:
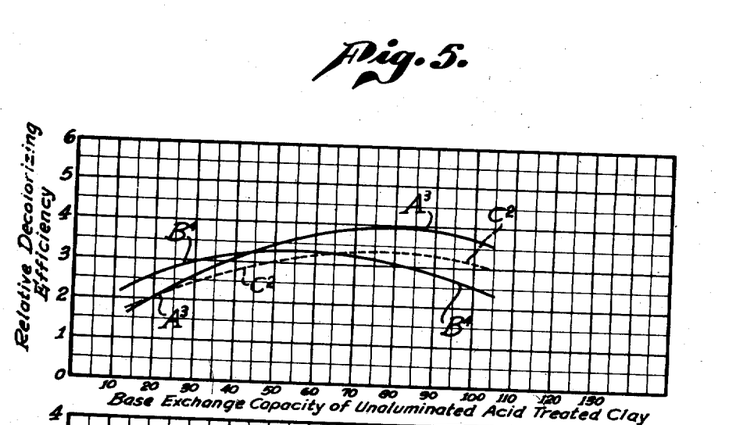

The effect of alumination on the decolorizing efficiency of the clay is shown in Fig. 4 and Fig. 5. In Fig. 4 curve $A^2$ is a plot of the decolorizing efficiency of the various clays also plotted in curve A, Fig. 1, to wit: clays treated with various dosages at 12.5% concentration. It will be observed that the maximum decolorizing efficiency is reached when the clay is treated at a dosage of 30 to 60 and as the dosage is increased the decolorizing efficiency is depreciated. Curve B shows the decolorizing efficiency of the clay plotted in curve A when aluminated with 5% $Al_2O_3$. Upon alumination of the clay treated with less than about 60 pounds the decolorizing efficiency is markedly depreciated. The maximum decolorizing efficiency of the aluminated clay is reached with a clay treated at a dosage of 75 to 140 pounds per hundred pounds of volatile free clay at which dosage the decolorizing efficiency of the hydrogen montmorillonite has been largely depreciated. The phenomenon, whereby the maximum beneficiation is obtainable by alumination of a clay which has been overtreated, i. e. brought beyond its optimum value, is thus found both in the development of catalytic activity and decolorizing activity. By regulating the dosage we can obtain a high catalytic efficiency and a high decolorizing efficiency, if the dosage is so regulated as to overtreat the clay to a point where there is a substantial depreciation of activity both catalytic and decolorizing from the optimum value developable by acid treatment.

In Fig. 5 is plotted the effect of alumination of hydrogen montmorillonite treated to various base exchange capacities. Curve $A^3$, is a plot of the variation of decolorizing efficiency with base exchange capacity obtained by treatment with various dosages at various concentrations. The curve is therefore independent of these variables and illustrates the variation of decolorizing activity with various degrees of leaching to various base exchange levels.

Here again we have the same phenomenon previously described. It is necessary to reduce the base exchange capacity of the clays to a level beyond that at which the maximum decolorizing efficiency is developed and indeed to a level where the decolorizing efficiency is largely impaired before the clay is placed in such condition that it may, on alumination, have its decolorizing efficiency appreciated. Curves $B^4$ and $C^2$ represent the decolorizing efficiency produced by aluminating to 5% $Al_2O_3$ (curve $B^4$) and to 1% of $Al_2O_3$ (curve $C^2$), the clays represented in Curve A. It will be observed that not until the base exchange capacity is reduced to around 40 to 80 does alumination raise the decolorizing efficiency above that of the acid treated clay. As will appear from the curve at higher base exchange values of the hydrogen montmorillonite the decolorizing efficiency of this is depreciated below that of the hydrogen montmorillonite subjected to alumination. This is the same region in which the hydrogen montmorillonite is converted to an aluminated clay of high catalytic capacity.

While the above curves and the specific values there found are those of the specific examples set forth above, the phenomenon which they illustrate are generic to the calcium and magnesium montmorillonite of low catalytic and decolorizing efficiency which on acid treatment are converted into hydrogen montmorillonites of high catalytic and decolorizing efficiency. The specific values may change but the same relationship of the operative factors exist. The optima and maxima and the depreciations and appreciations previously set forth will be found, although the specific location of the actual maxima and the intensity of the changes effected on alumination may change. It will be found however that by adjusting the acid treatment of the clay to reduce the base exchange capacity of the hydrogen montmorillonite to the optimum value which may be determined in the same manner as illustrated in the above discussion that the clay will be placed in such condition as to obtain a maximum enhancement of catalytic activity and to produce clay which not only has a high catalytic activity but also will have a high decolorizing efficiency.

In addition to controlling the catalytic and decolorizing efficiency of the clay by controlling the acid treatment to establish the desired base exchange capacity of the hydrogen montmorillonite, I have also found that I may control the base exchange capacity of the aluminated clay and therefore its efficiency.

Thus it will appear from the above examples as illustrated in Fig. 2, the increase of alumination from 1% to 5% (Example 1) shifted the base exchange capacity from 100.5 to 119.4. In region of 80 base exchange capacity where the curve is flat the change of from 1 to 5% resulting in a lowering of the base exchange capacity we obtained little or no change in the catalytic rating. See Example 3. However, in increasing the alumination from 1 to 20% in Example 5 we decrease the base exchange value from 76.7 to 28.2 and we descend the left hand side of the curve and we get a lowering of the efficiency. We can thus, by controlling the degree of alumination by regulating the amount of hydrated alumina reacted with the hydrogen montmorillonite control the base exchange capacity of the clay and its efficiency.

It is important to note that the hydrated alumina is not merely deposited in the hydrogen montmorillonite but actually reacts therewith as is evidenced by the change in base exchange capacity of the clay. Reference to the examples will show that in each case the hydrated alumina alters the base exchange capacity of the hydrogen montmorillonite.

The natural clay is fundamentally montmorillonite, having base exchange capacity of about 124 millequivalents per 100 grams volatile free substance, this capacity being saturated largely with alkaline earth ions such as calcium and magnesium. Natural clay therefore can be defined as a calcium or magnesium montmorillonite. Such is the clay which was used in the examples. Upon acid treating the clay one of the first reactions is the replacement of the calcium and magnesium ions to form a product which is predominately hydrogen montmorillonite. This material may be termed a clay acid in that it shows acid properties. On relatively light acid treatment calcium and magnesium are not completely removed. As the acid leaching continues alumina and also iron oxide present as impurities are removed. Hydrogen enters into the lattice of the leached clay as the alumina is extracted and there is a loss in base exchange capacity. It is believed however that as long as the resulting product is not subjected to rigorous treatment such as extensive dehydration, the hydrated silica which is part of the original montmorillonite lattice and which is left as a result of the leaching is isomorphic with the original montmorillonite, that is to say, the silica and oxygen skeleton of the original montmorillonite is retained. As this extraction continues with reduction of base exchange capacity as explained, the calcium and magnesium and alumina are more and more completely removed, and a material of lowered base exchange capacity is left.

When such a material is aluminated depending on the nature of alumination and the state of the leached clay, we may get either a decrease or increase in base exchange capacity. The corelation here set forth shows that the catalytic activity of the acid leached and aluminated clay will depend on the base exchange capacity of the acid leached and aluminated clay.

In the Fig. 2 the curves clearly show a correlation between base exchange capacity and catalytic activity, and it is believed that the same active centers are concerned in both, in catalysis and in metathetical reactions such as base exchange. Generally it may be stated that for maximum activity of a hydrogen montmorillonite it is desirable to employ a hydrogen montmorillonite structure which is not contaminated by calcium or iron or is as free of acid elements as is practical. The above example shows that by producing such a product by leaching a calcium montmorillonite we reach an optimum region for base exchange capacity of the leached hydrogen montmorillonite in the neighborhood of about 50 where maximum catalytic and decolorizing exists. There is like optimum region for the catalytic activity of aluminated montmorillonite in the region ranging from 30 upward, where the aluminated montmorillonite is produced from such a hydrogen montmorillonite.

While the exact values given above will vary as between clays of the same class employed, they will be found to respond in like manner to the above process.

This change in the base exchange of the capacity of the acid treated clay indicates that the alumina enters into chemical combination with the clay and is not merely physically deposited thereon. The reduction, which results from this alumination, in the content of silica which is soluble in sodium carbonate also confirms my belief that the alumina enters into chemical combination with the clay. While I do not wish to be bound by any theories of the chemical reactions which occur, the results which I have obtained and which have been described above are reasonably explained by the reconstitution of the montmorillonite lattice structure by the reintroduction of alumina into the residual silica skeleton obtained by the leaching of the montmorillonite. The montmorillonite structure thus formed is free of the metallic ions such as calcium, magnesium and iron present in the original base clay, and the enhanced catalytic activity which is obtained is due at least in part to the removal of these materials.

The effect of varying the pH of the solution is shown by the following example.

Example 8

The clay produced by acid treatment using the acid dosage of 125 pounds at a concentration of 12.5%, was treated with sufficient aluminum sulfate for deposition of hydrated alumina in an amount of 5% (calculated as $Al_2O_3$) as set forth in Example 4, but the ammonia was added in amounts to control the final pH as given in the table below. The clay was employed in catalytic treatment as described above, and the catalytic efficiency determined.

| Final pH | Base exchange capacity | Catalytic efficiency |
|---|---|---|
| 4.3 | 71.2 | 5.2 |
| 5.0 | 73.7 | 5.2 |
| 6.0 |  | 5.2 |
| 7.0 | 81.6 | 5.4 |
| 9.0 |  | 5.0 |

Example 9

The effect of washing of the various clays upon which hydrated aluminum oxide has been deposited can be seen from the following examples.

The clay which was treated with 75 pounds of sulfuric acid per hundred pounds of volatile free clay at 12.5% concentration is aluminated by the deposit of 1% alumina (see Example 4), and which was reported as having a relative catalytic efficiency of 4.6 was obtained as previously stated by washing in the manner set out using 1 gallon per pound of volatile free clay. The same clay, after alumination with 1% $Al_2O_3$ as described above, was filtered but the wash was omitted. Its relative catalytic activity was enhanced to a value of 5.2. The clay treated according to Example 3 (with 75 pounds of acid at 12.5% concentration) and then treated with alumina for deposit of 5% of $Al_2O_3$, as shown in Example 4, and then washed as above described with distilled water after filtration from the alumination stage showed 5.4 relative catalytic efficiency. On the other hand, after aluminum precipitation and filtration and drying without any wash of the aluminated clay, it had its relative catalytic activity reduced to a value of 4.4.

The effect of this secondary wash is also seen from the following examples. Clay was treated with 75 pounds of acid at 12.5% concentration according to Example 4 and then treated to deposit hydrated alumina according to the procedures previously set forth depositing, however, an amount of hydrated alumina equal to 2% calculated as $Al_2O_3$. The final pH of the solution at the end of the ammonia addition was 7. The aluminated clay was filtered and then dried without any intermediate washing. Its relative catalytic activity was 5. However, when this aluminated clay was washed on the filter prior to drying with a limited amount of water, about ¼ of a gallon of soft water per pound of volatile free clay and then dried its catalytic activity was 5.4.

It appears advisable to adjust the degree of wash and this may be determined by employing the procedure set forth above, testing the clay for efficiency, thus adjusting the wash to the degree of alumination.

Example 10

A clay which was acid treated with a dosage of 125% $H_2SO_4$ at 12.5% concentration was washed as previously described and mixed with $Al_2(SO_4)_3$ equal to 33% of the volatile-free clay in concentration of 1.14% and boiled for 3½ hours. The aluminated clay was washed with distilled water and dried. The clay was used in cracking oil as in the procedure previously described, and had a catalytic efficiency of 4.8. The alumination in this procedure acted as in the previous cases to increase the catalytic activity and adjust the base exchange capacity to 52.0. This clay falls in curve $B^2$, Fig. 2.

Example 11

The clay was treated with a dosage of 75% acid at a concentration of 12.5% in the manner previously described. The filtered acid treated clay was washed down to an acidity of 14 milligrams KOH (based upon a clay of 20% volatile matter). This washed clay was slurried with hydrated alumina having the formula of $HAlO_2$ in an amount equal to 1.5% (calculated as $Al_2O_3$). The mixture was boiled for 3 hours and then neutralized with ammonium hydroxide to a final pH value of 5. The clay was filtered and the filter cake dried. The clay was used as a cracking catalyst according to the procedures previously set forth, and showed a catalytic activity of 4.6.

It is believed that the excess acidity of the clay reacts with the hydrated alumina which has been added to produce aluminum sulfate, which upon further boiling is hydrolyzed and freshly precipitated hydrated alumina deposited on the clay.

Example 12

The clay treated with an acid dosage of 60% at a concentration of 25%, as described in Example 2, was, before drying, slurried with an aluminum sulfate solution at ordinary temperature, then again filtered and washed to an acidity of about 5 milligrams of KOH (based upon a clay of 20% volatile matter). The acid treated clay showed an increase in the $Al_2O_3$ content of about 0.5% over the alumina content of the acid treated clay, apparently due to base exchange of the aluminum ion onto the surface of the clay. The clay was then dried and used as a cracking catalyst in the cracking procedure previously set forth. It showed a catalytic efficiency of 4.6.

It is to be understood that the foregoing description of embodiments of my invention is for purposes of illustration and modifications may be made therein without departing from the spirit of the appended claims.

I claim:

1. An acid activated sub-bentonite montmorillonite clay having a base exchange capacity within the range of about 30 to 90 milliequivalents per 100 grams of volatile free clay impregnated with hydrated alumina.

2. A cracking catalyst comprising an acid activated sub-bentonite montmorillonite clay activated to an extent greater than that necessary to develop the optimum catalytic activity for the cracking of petroleum and to such an extent that the catalytic activity is less than said optimum but not below about three times that of said clay without acid treatment, impregnated with hydrated alumina.

3. An acid activated sub-bentonite montmorillonite clay aluminated with hydrated alumina and having a catalytic efficiency in the cracking of petroleum in excess of four times the catalytic efficiency of the native clay from which said acid activated and aluminated clay is produced.

4. An acid activated sub-bentonite montmorillonite clay aluminated with hydrated alumina and having a base exchange capacity after such alumination between about 50 and 90 milliequivalents per 100 grams of volatile free clay.

5. A composition of matter as defined in claim 1 in which said clay impregnated with hydrated alumina has a base exchange capacity with the range of about 50 to 90 milliequivalents per 100 grams of volatile free clay.

6. A method of producing a catalyst useful for the catalytic cracking of petroleum which comprises treating acid activatable sub-bentonite montmorillonite clay with acid to produce an acid activated sub-bentonite montmorillonite clay having a base exchange capacity within the range of about 30 to 90 milliequivalents per 100 grams of volatile free clay, washing the treated clay to remove products of such treatment and excess acid from the acid treated clay and impregnating the resulting acid treated sub-bentonite montmorillonite clay with hydrated alumina.

7. Process as defined in claim 6 in which said acid treated sub-bentonite montmorillonite clay is impregnated with hydrated alumina in amount sufficient to alter the base exchange capacity of the acid treated clay producing an aluminated clay having a base exchange capacity within the range of about 50 to 90 milliequivalents per 100 grams of volatile free clay.

8. A method of producing a catalyst useful for a catalytic cracking of petroleum which comprises treating acid activatable sub-bentonite montmorillonite clay with acid to produce a clay having a base exchange capacity within the range of about 30 to 90 milliequivalents of 100 grams of volatile free clay, impregnating said acid treated clay with hydrated alumina by mixing said clay with aluminum salt solution and adding ammonia to the resulting mixture to adjust the pH of said mixture to within the range of 3 to 9.

9. Process as defined in claim 8 in which said aluminum salt is aluminum sulfate.

10. A method of producing a catalyst useful for the catalytic cracking of petroleum which comprises acid activating an acid activatable sub-bentonite montmorillonite clay to an extent greater than that necessary to develop the optimum catalytic activity for the cracking of petroleum and sufficient to form an acid activated sub-bentonite montmorillonite clay of catalytic activity less than said optimum but insufficient to produce a catalytic activity below about three times that of said acid activatable sub-bentonite montmorillonite clay before such acid treatment, and impregnating said acid activated sub-bentonite montmorillonite clay with hydrated alumina in amount sufficient to produce a resulting clay product impregnated with hydrated alumina having a catalytic activity for cracking a petroleum appreciably greater than that of said acid activated clay.

11. A process as defined in claim 10 in which said acid activated sub-bentonite montmorillonite clay has a base exchange capacity within the range of about 30 to 90 milliequivalents per 100 grams of volatile free clay.

12. A process of converting hydrocarbons which comprises subjecting hydrocarbons at an elevated temperature to an activated aluminated acid leached montmorillonite clay, produced by treating a sub-bentonite of the montmorillonite family with acid to reduce the base exchange capacity of said clay to less than 90 and more than 30 milliequivalents per 100 grams of clay, and combining said clay in the presence of water with precipitated hydrated alumina formed by reaction between an aluminum salt and an added base and producing by such combination a clay combined with said hydrated alumina and having a base exchange capacity within the range of about 50 to about 90 milliequivalents per 100 grams of clay.

13. A process of converting hydrocarbons which comprises subjecting hydrocarbons at an elevated temperature to an acid activated sub-bentonite montmorillonite clay aluminated with hydrated alumina and having a catalytic efficiency in the cracking of petroleum in excess of four times the catalytic efficiency of the native clay from which said acid activated and aluminated clay is produced.

14. A process of cracking hydrocarbons which comprises subjecting hydrocarbons at an elevated temperature to an acid activated and aluminated sub-bentonite montmorillonite clay produced by acid activating an acid activatable sub-bentonite montmorillonite clay to an extent greater than that necessary to develop the optimum catalytic activity for the cracking of petroleum and sufficient to form an acid activated sub-bentonite montmorillonite clay of catalytic activity less than said optimum but insufficient to produce a catalytic activity below about three times that of said acid activatable sub-bentonite montmorillonite clay before such acid treatment, and impregnating said acid activated sub-bentonite montmorillonite clay with hydrated alumina in amount sufficient to produce a resulting clay product impregnated with hydrated alumina having a catalytic activity for cracking a petroleum appreciably greater than that of said acid activated clay.

FREDERICK J. EWING.